United States Patent [19]
Jung et al.

[11] Patent Number: 5,528,294
[45] Date of Patent: Jun. 18, 1996

[54] METHOD FOR ERADICATING SMEAR IN A CHARGE-COUPLED DEVICE CAMERA

[75] Inventors: Sang-il Jung, Seoul; Seung-woo Lee, Suwon, both of Rep. of Korea

[73] Assignee: Samsung Electronics Co., Ltd., Suwon, Rep. of Korea

[21] Appl. No.: 400,399

[22] Filed: Mar. 3, 1995

Related U.S. Application Data

[63] Continuation of Ser. No. 114,045, Aug. 31, 1993, abandoned.

[30] Foreign Application Priority Data

Aug. 31, 1992 [KR] Rep. of Korea .................. 92-15791

[51] Int. Cl.6 ........................................... H04N 9/64
[52] U.S. Cl. ................. 348/249; 348/230; 348/262; 348/264
[58] Field of Search .................. 348/243, 248, 348/249, 250, 230, 241, 262, 264; H04N 9/64

[56] References Cited

U.S. PATENT DOCUMENTS

| | | | |
|---|---|---|---|
| 4,481,539 | 11/1984 | Miese et al. | 38/213 |
| 4,858,156 | 8/1989 | Martin | 364/560 |
| 5,134,474 | 7/1992 | Hanafase et al. | 358/113 |

FOREIGN PATENT DOCUMENTS

| | | | |
|---|---|---|---|
| 58-69173 | 4/1983 | Japan | H04N 5/30 |
| 227184 | 8/1991 | Japan | H04N 5/335 |
| 496585 | 2/1992 | Japan | H04N 5/335 |
| 5167931 | 2/1993 | Japan | H04N 5/335 |

Primary Examiner—Wendy R. Greening
Assistant Examiner—Bipin Shalwala
Attorney, Agent, or Firm—Cushman Darby & Cushman

[57] ABSTRACT

A smear noise eradication method in a charge-coupled device (CCD) type camera comprises the steps of inputting respective image signals from one pair of CCD image pick-up devices whose lengthwise directions of corresponding vertical CCDs are perpendicularly disposed with respect to each other, and which are installed on an optical path, and eradicating smear noise after comparing the one pair of image signals according to corresponding pixels. Using the one pair of CCD image pick-up devices, the image signals of the CCD image pick-up devices are compared with each other. When the smear noise is generated, it is eradicated to obtain a high quality image signal.

8 Claims, 2 Drawing Sheets

METHOD FOR ERADICATING SMEAR IN A CHARGE-COUPLED DEVICE CAMERA

This is a Continuation of application Ser. No. 08/114,045, filed on Aug. 31, 1993, which was abandoned upon the filing hereof.

BACKGROUND OF THE INVENTION

The present invention relates to a charge-coupled device (CCD) camera, and more particularly to a method for eradicating smear noise which is generated by intense incident light in a CCD camera.

As shown in FIG. 1, a general CCD image pick-up device comprises a plurality of photoelectric conversion elements, that is, a plurality of PN photoelectric diodes 10 formed in a matrix configuration on a light reception portion 1, a plurality of vertical CCDs 20 which are respectively disposed in correspondence to each row of PN photoelectric diodes 10, and transmits the photoelectrically converted signal by the PN photoelectric diodes 10 of the corresponding row, a horizontal CCD 30 which receives signals line by line from the plurality of vertical CCDs 20, and an output means 40 for outputting signals output from horizontal CCD 30, all of which are integrally incorporated on a semiconductor substrate.

Referring to FIGS. 1 and 2, each pixel 2 in light reception portion 1 comprises a region of photoelectric conversion element 10 and a region of a vertical CCD 20. That is, a p-type well 102 is formed on an n-type substrate 100. Also, $n^+$ region 103 and n region 110 are formed near the surface of a p-type well 102 between $p^+$ separation regions 104 and 106, respectively. The $n^+$ region 103 is provided as PN photoelectric diode 10, and n region 110 is provided as a buried channel of vertical CCD 20. Between $n^+$ region 103 and n region 110, a transfer gate region 112 is allocated. On n region 110 and transfer gate region 112 are formed gate electrodes 116 and 118 made of a conductive layer such as polycrystalline silicon, after interposing an insulation film 114. The remaining portions (excluding $n^+$ region 103) is covered with a light shield film 120 made of a metal such as aluminum. Thus, light is incident in $n^+$ region 103 via an opening 122. The light incident in the $n^+$ region is photoelectrically converted and is expressed as a quantity of charges according to an intensity of light. The charge quantity signal is transferred to n region 110 of vertical CCD 20 via transfer gate region 112 according to a signal applied to gate electrode 116. The charge quantity signal transferred to vertical CCD 20 is transferred to horizontal CCD 30.

The above CCD image pick-up device generates a smear carrier by a diffusion of charges generated from a deeper region than that of a depletion layer of a photodiode by incident light, as shown in FIG. 2. Also, the smear carrier is generated directly from a vertical CCD depletion region of the n region by a multiple reflection in an area designated as "A."

Prior art technologies for eradicating such a smear phenomenon form a light intercept film made of a silicide, metal, etc., on the vertical CCD, or intercept light by a light intercept film up to a lateral surface of a gate electrode, thereby minimizing incident light due to multiple reflection. Also, methods have been introduced for preventing the carrier from being input to the vertical CCD during the signal transfer period of the vertical CCD by adjusting an overflow drain voltage, or for reducing a transfer time of the vertical CCD to reduce an input time of the carrier to the vertical CCD using a frame interline transmission method.

However, the above-described conventional smear suppression technologies can reduce the smear components, but cannot completely eradicate smear noise when very strong light is incident. Thus, high quality images cannot be obtained.

SUMMARY OF THE INVENTION

Therefore, to solve the above problems, it is an object of the present invention to provide a smear eradication method for eradicating smear components in a CCD camera.

To accomplish the above object of the present invention, there is provided a method for eradicating smear noise in a CCD camera comprising the steps of:

inputting respective image signals from one pair of CCD image pick-up devices whose lengthwise directions of corresponding vertical CCDs are perpendicularly disposed with respect to each other, and which are installed on an optical path; and eradicating smear noise by comparing the one pair of image signals according to corresponding pixels.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

A preferred embodiment of the present invention will be described below with reference to the accompanying drawings in more detail.

Figure 1:
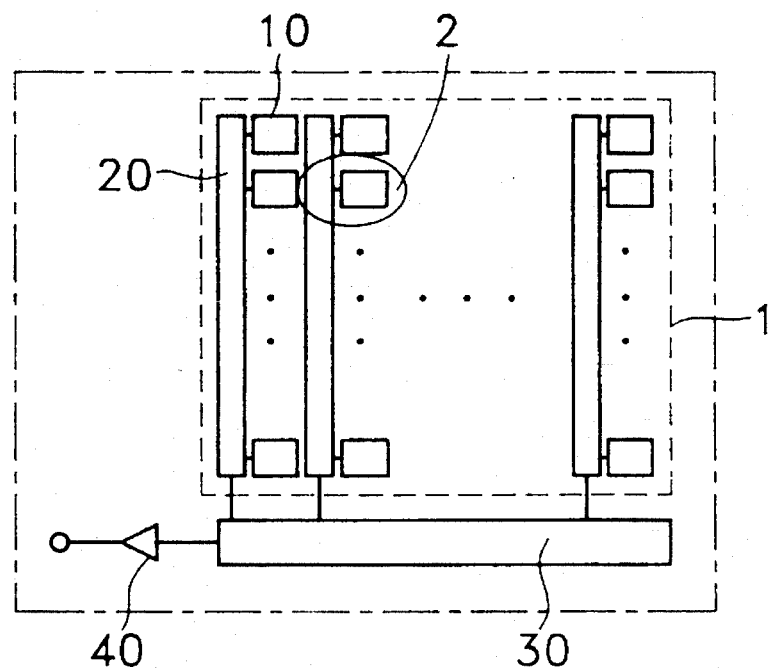
FIG. 1 is a schematic plan view of a general CCD image pick-up device.
Figure 2:
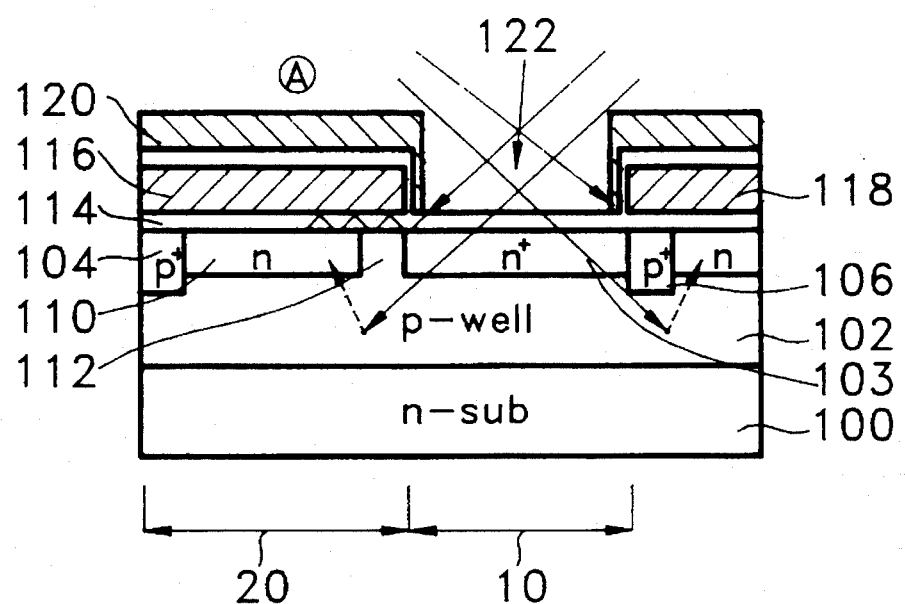
FIG. 2 is a cross-sectional diagram of a pixel shown in FIG. 1.
Figure 3:
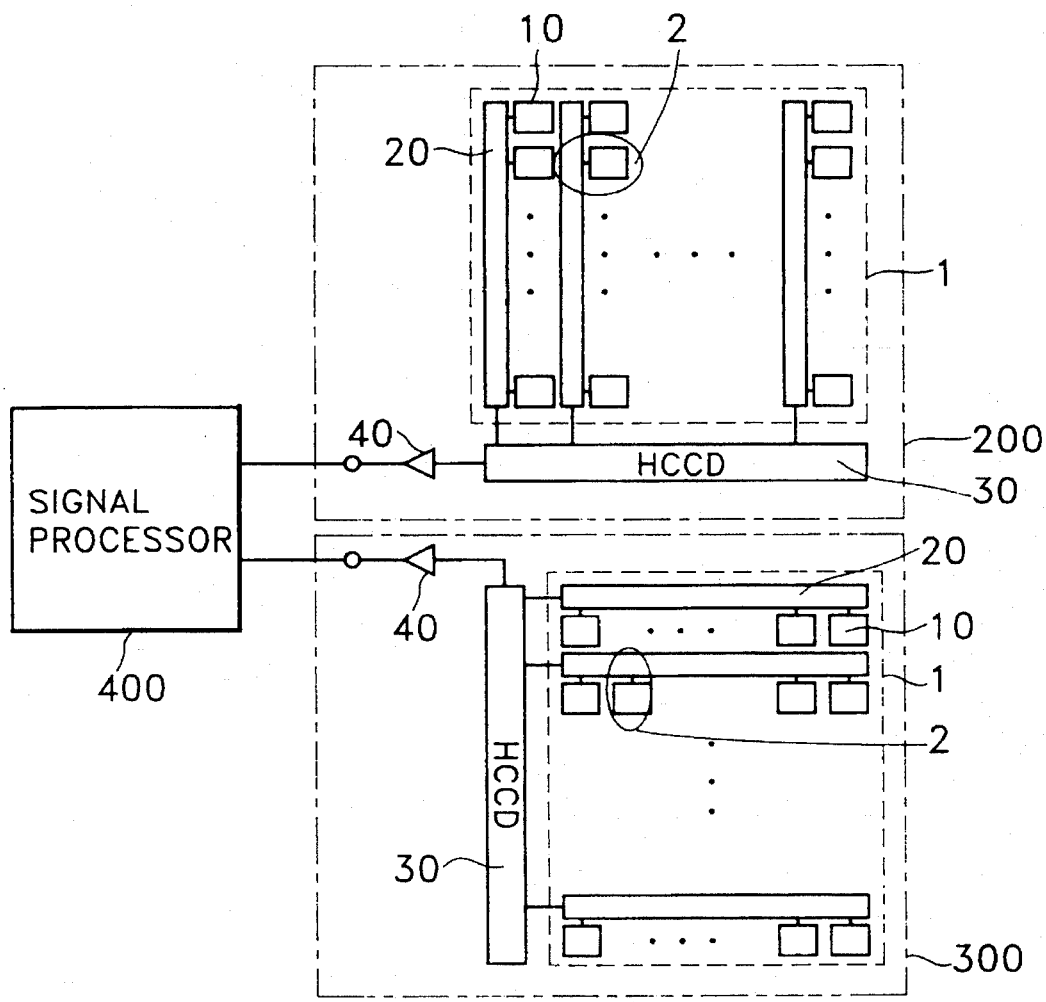
FIG. 3 is a view of a CCD camera using a smear eradication method according to the present invention.

In FIG. 3, a CCD camera using a smear eradication method according to the present invention comprises a pair of CCD image pick-up devices 200 and 300 on an optical path, in which a plurality of vertical CCDs 20 of one CCD image pick-up device 200 is installed so that its lengthwise direction is perpendicular to that of another CCD image pick-up device 300. Here, image information is separately and identically incident upon CCD image pick-up devices 200 and 300 via a prism (not shown). When CCD image pick-up devices 200 and 300 are installed so that the lengthwise directions of the corresponding vertical CCDs thereof are perpendicular to each other, smear noise is generated only in the direction of vertical CCD 20 of CCD image pick-up device 200 by a smear generation mechanism, while smear noise is generated only in the direction of vertical CCD 20 of CCD image pick-up device 300 having a phase difference of 90° from CCD image pick-up device 200.

Figure 4A:
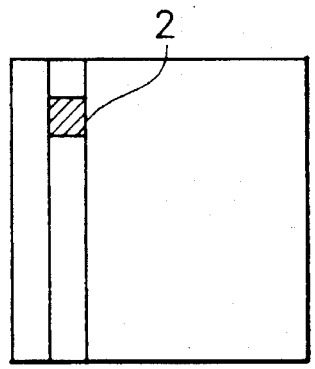
FIGS. 4A and 4B are views for explaining image signals obtained by the respective CCD image pick-up devices of FIG. 3.
Figure 4B:
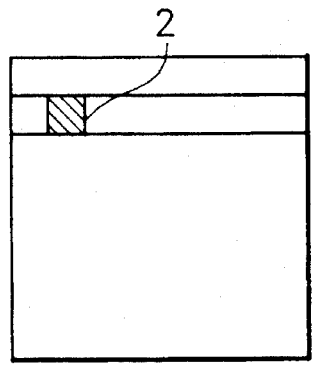

Such smear components are generated as shown in FIGS. 4A and 4B. The smear components are generated as shown in FIG. 4A in the case of CCD image pick-up device 200, and as shown in FIG. 4B in the case of CCD image pick-up device 300. The respectively generated smear components are generated so as to be perpendicular to each other, and are then input to a signal processor 400.

Thus, signal processor 400 of FIG. 3 compares image signals supplied from a pair of CCD image pick-up devices 200 and 300 according to each pixel, to thereby find and eradicate the smear noise.

In the present invention as described above, the respective image signals of a pair of CCD image pick-up devices whose lengthwise directions of the corresponding vertical CCD are installed perpendicular to each other, are compared. Thereafter, when the smear noise is generated, it is eradicated to obtain a high quality image signal having no smear noise.

What is claimed is:

1. A charge-coupled device (CCD)-type camera, comprising:

a first CCD image pick-up device having a column of photosensor elements disposed along a first linear axis;

a second CCD image pick-up device having a column of photosensor elements disposed along a second linear axis, wherein a first imaginary line passing along and through said first linear axis intersects a second imaginary line passing along and through said second linear axis; and, a signal processor for comparing respective image output signals of said first and second CCD image pick-up devices, on a pixel-by-pixel basis, in order to detect smear noise, and for eradicating any detected smear noise, on a pixel-by-pixel basis.

2. The camera as set forth in claim 1, wherein the intersection of said first and second imaginary lines forms a 90° angle.

3. A method for eradicating smear noise in a charge-coupled device (CCD)-type camera having a first CCD image pick-up device which includes a column of photosensor elements disposed along a first linear axis and a second CCD image pick-up device which includes a column of photosensor elements disposed along a second linear axis, wherein a first imaginary line passing along and through said first linear axis intersects a second imaginary line passing along and through said second linear axis, said method comprising the steps of:

comparing respective image output signals of said first and second CCD image pick-up devices, on a pixel-by-pixel basis, in order to detect smear noise; and, eradicating any detected smear noise, in response to said comparing step, on a pixel-by-pixel basis.

4. The method as set forth in claim 3, wherein the intersection of said first and second imaginary lines forms a 90° angle.

5. A charge-coupled device (CCD)-type camera, comprising:

a first CCD image pick-up device including a plurality of vertical CCDs oriented parallel to one another and each including a respective column of photosensor elements, and a horizontal CCD oriented perpendicularly to and coupled to said vertical CCDs;

a second CCD image pick-up device including a plurality of vertical CCDs oriented parallel to one another and each including a respective column of photosensor elements, and a horizontal CCD oriented perpendicularly to and coupled to said vertical CCDs of said second image pick-up device;

wherein an imaginary line passing along and through a linear axis of said horizontal CCD of said first CCD image pick-up device intersects a second imaginary line passing along and through a linear axis of said horizontal CCD of said second CCD image pick-up device; and, a signal processor for comparing respective image output signals of said first and second CCD image pick-up devices, on a pixel-by-pixel basis, in order to detect smear noise, and for eradicating any detected smear noise, on a pixel-by-pixel basis.

6. The camera as set forth in claim 5, wherein the intersection of said first and second imaginary lines forms a 90° angle.

7. A method for eradicating smear noise in a charge-coupled device (CCD)-type camera including a first CCD image pick-up device including a plurality of vertical CCDs oriented parallel to one another and each including a respective column of photosensor elements, and a horizontal CCD oriented perpendicularly to and coupled to said vertical CCDs, a second CCD image pick-up device including a plurality of vertical CCDs oriented parallel to one another and each including a respective column of photosensor elements, and a horizontal CCD oriented perpendicularly to and coupled to said vertical CCDs of said second image pick-up device, and, wherein an imaginary line passing along and through a linear axis of said horizontal CCD of said first CCD image pick-up device intersects a second imaginary line passing along and through a linear axis of said horizontal CCD of said second CCD image pick-up device, said method comprising the steps of:

comparing respective image output signals of said first and second CCD image pick-up devices, on a pixel-by-pixel basis, in order to detect smear noise; and, eradicating any detected smear noise, in response to said comparing step, on a pixel-by-pixel basis.

8. The method as set forth in claim 7, wherein the intersection of said first and second imaginary lines forms a 90° angle.

\* \* \* \* \*